May 7, 1946.                    F. W. SIDE                    2,400,028
BEARING
Filed July 16, 1943
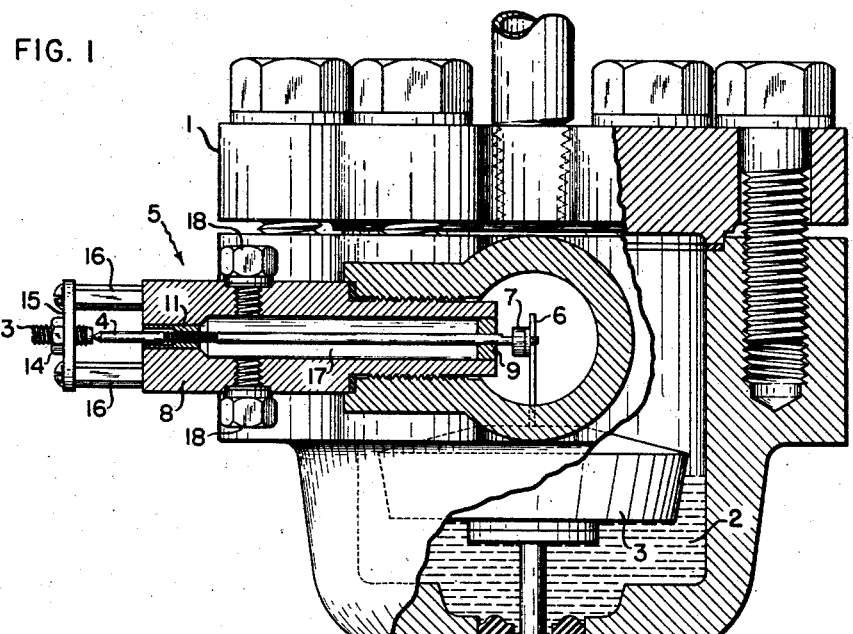
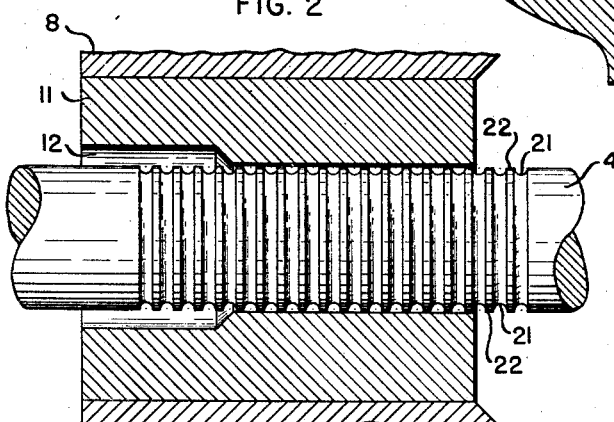
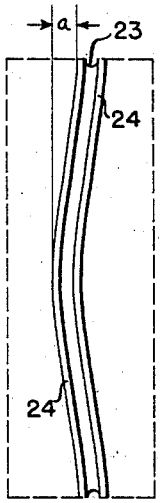
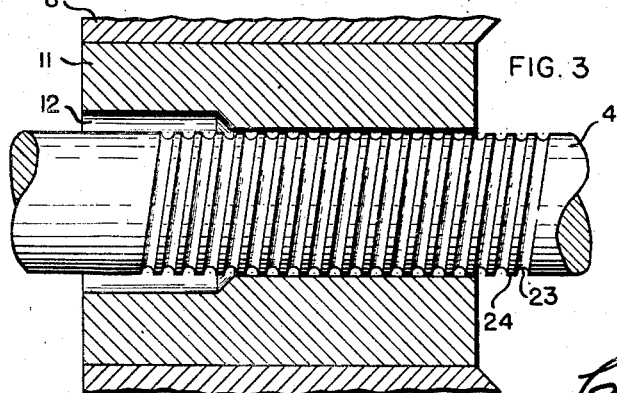
INVENTOR.
FREDERICK W. SIDE
BY
*GBSpangenberg*
ATTORNEY.

Patented May 7, 1946

2,400,028

UNITED STATES PATENT OFFICE 2,400,028

BEARING

Frederick W. Side, Philadelphia, Pa., assignor to The Brown Instrument Company, Philadelphia, Pa., a corporation of Pennsylvania Application July 16, 1943, Serial No. 494,958

4 Claims. (Cl. 308—36.3)

The present invention relates to bearings, and more particularly to a bearing that receives a shaft in pressure tight relation so that a pressure differential may be obtained between the ends of a shaft.

In many cases such as in a flow meter or a liquid level gauge, for example, it is necessary to transmit the movement of one part that is within a closed container at a pressure different from, and usually higher than atmosphere, to another part that is located in a place that is at atmospheric pressure. When this is done the two parts are connected to the opposite ends of a shaft that extends through a bearing located in a wall of the container. It is, of course, necessary that the bearing and shaft be so assembled that they are pressure tight.

An object of the present invention is to provide the combination of a pressure tight bearing and a shaft that is extremely sensitive to rotative movement imparted to the shaft. It is a further object of the invention to provide a bearing and shaft combination which are so configured that, in effect, a series of piston rings is formed on the shaft along the portion received by the bearing, which rings act to reduce the friction between the shaft and bearing. When these rings are properly lubricated they act to help maintain the pressure differential across the shaft and to keep the shaft and bearing clean.

The various features of novelty which characterise my invention are pointed out with particularity in the claims annexed to and forming a part of this specification. For a better understanding of the invention, however, its advantages and specific objects attained with its use, reference should be had to the accompanying drawing and descriptive matter in which I have illustrated and described preferred embodiments of the invention.

In the drawing:

Figure 1 shows a view, partly in section, of a manometer including the pressure tight bearing, Figure 2 is an enlarged sectional view of a portion of Figure 1, Figure 3 is a view similar to Figure 2 showing a different type of groove, and Figure 4 is a development of the groove of Figure 3.

There is shown in Figure 1 a manometer 1 which may be of any conventional form and which, as is well known, includes a pair of chambers to which a differential pressure is applied. As the pressure in each of the chambers varies a measuring liquid, which is usually mercury, rises and falls in the chambers in accordance with the value of the pressure. A float 3 which rests on the surface of the mercury and moves as the level changes is used to transmit this level by a shaft 4, that is received in a bearing 5, to any type of receiving apparatus which it may be desired to use. The shaft 4 may have connected to it, either directly or indirectly, recording or control elements so that as the shaft rotates a record will be made of the level of the liquid 2 and various control instrumentalities may be operated to bring this level to some desired point. Movement of the float 3 is imparted to the shaft 4 by means of a rod 6 which is attached to and projects upwardly from the float and which is pivoted to an arm 7 that is fastened in nonrotative relation upon the shaft 4.

The bearing 5 that receives the shaft 4 to support the same, so that one end may be in the manometer at the pressure thereof and the other end may be at atmospheric pressure, in combination with the shaft forms the primary subject matter of the present invention. The bearing 5 is shown as being formed by a tubular member 8 which has bushings 9 and 11 in its opposite ends. The bushing 9 consists of a disc which may be reamed to the diameter of the shaft or slightly larger than that diameter and which serves to support the rear end of the shaft. The front bushing 11 forms the pressure seal of the bearing and is provided with an opening through which the shaft 4 extends with small tolerances. This opening is formed with its left or front end enlarged as shown at 12 to provide a grease seal which will protect the shaft at the point at which the shaft and the close fitting portion of the bushing meet.

The pressure in the manometer which is generally considerably higher than that of the atmosphere acts to force the shaft 4 to the left against a thrust bearing 13 which is held in position by a lock nut 14 on a support 15. This support is mounted upon threaded posts 16 which project forwardly from the body of the bearing. The thrust member 13 can be so adjusted that the shaft 4 projects a predetermined distance in front of the tubular member 8. The portion of the tubular member 8 between the bushings 9 and 11 forms a grease chamber 17 that is to be filled with some suitable type of grease or other sealing compound that will help form a pressure seal along with the bushing 11. The grease is placed in this chamber through openings in the tubular member 8 which openings are closed by threaded plugs 18.

As best shown in Figure 2, the shaft 4 is formed with a series of concentric grooves 21 between which are left rings 22 that are the same diameter as the shaft 4. These rings and grooves are formed on the shaft at the point where it is received by the bushing 11 and extend for a distance slightly in excess of the length of the bushing. In this embodiment of the invention the grooves are perpendicular to the axis of the shaft and they serve to retain in them small amounts of the grease which flows between the shaft and its bushing under the pressure within the manometer. When assembling the bearing, the shaft is first lapped in the bushing 11 so that an extremely close fit may be obtained. After this the shaft is removed and the grooves 21 are ground into its surface. When the shaft has been cleaned the grooves are filled with grease and the shaft is replaced in the bushing. It is noted that a supply of grease is also placed in the enlarged portion 12 of the bore of the bushing. This grease prevents the access of corrosive gases, grit, dirt, etc., to the face of the bushing where the shaft projects therefrom and thereby serves to prevent premature wear of the shaft or bushing at this point. As the shaft is rotated there is a comparative small portion of the shaft which engages the bushing so that the friction between these two parts is very small. The grease which is retained by the grooves 21 acts as pockets in which any foreign matter that may get into the space between the shaft and the bushing may lodge so that this foreign matter cannot score the shaft or the bushing, and therefore cause a binding of the same. This construction makes an extremely sensitive bearing with low static friction so that any slight force which is applied to one end of the shaft will cause immediate rotation thereof.

There is shown in Figures 3 and 4 another type of groove which may be used on the shaft 4 in place of the grove shown in Figure 2. In this case the groove 23 is wavey in form as is best shown by the development of the same in Figure 4. The lead of the groove, shown at $a$ in Figure 4, is such that one groove overlaps the other. Therefor as the shaft is rotated the entire inner surface of the bushing will be lubricated by the grease which is retained in the grooves. In this embodiment of the invention rotation of the shaft moves the grease which is retained within the grooves 23 axially of the bushing to completely wipe the interior of the same and to pick up any particles of grit, etc., which may have worked their way into this space. In this case, also, there is a minimum of surface of the shaft in engagement with the bushing. It is noted that the shaft in both Figures 2 and 3 is so shaped that it acts as a series of piston rings in the bushing. These rings retain grease between them which help to form a pressure seal of the structure.

From the above description it will be seen that I have provided a pressure tight bearing in which the shaft and the bushing that support the shaft are so configured relatively to each other that a bearing is produced which will withstand a substantial amount of pressure and in which a minimum amount of surface engagement is obtained between the shaft and its bushing. This construction provides an extremely sensitive shaft in which rotation of the same takes place immediately as a force is applied to one end thereof.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. A pressure tight bearing comprising a bushing having an opening formed in it, said opening being of two different diameters, a shaft extending through said opening and being snugly received in the portion thereof having the smaller diameter, said shaft having formed on that part of its surface received in said opening a plurality of circumferential grooves, the grooves and that portion of the opening between its larger diameter and the shaft being filled with a lubricating compound, the lubricating compound between said shaft and the large diameter of said opening serving as a seal to keep dirt from entering from that side between the shaft and the small portion of said opening.

2. A pressure tight bearing comprising a bushing having an opening formed therein, said opening being of two different diameters, a shaft extending through said opening and being snugly received by the portion of the opening having the smaller diameter, said shaft being formed with a plurality of circumferential grooves on that portion of its surface received by said bushing, said grooves being perpendicular to the axis of said shaft, and a sealing compound in said grooves and the portion of the opening between the larger diameter and said shaft, the sealing compound between the large diameter of said opening and of said shaft serving as a seal to prevent dirt from entering between the small diameter of the opening and said shaft.

3. A pressure tight bearing comprising a bushing having an opening therethrough, a shaft extending through said opening and being snugly received by the same, said shaft being formed on the portion thereof received by said bushing with a series of circumferential grooves, said grooves being at an angle to the axis of said shaft and forming when developed on a flat surface a wavy line, and a lubricating compound received by said grooves.

4. The combination of claim 3 in which the grooves on said shaft are so formed and placed at such an angle to the axis of the shaft that the grooves overlap, whereby upon rotation of the shaft the entire surface of the bushing will be wiped by the lubricating compound in said grooves.

FREDERICK W. SIDE.